(12) United States Patent
Lohmar et al.

(10) Patent No.: US 12,382,525 B2
(45) Date of Patent: Aug. 5, 2025

(54) SIMULTANEOUS DATA PATHS FOR QOS CONTROL OF SERVICE DATA TRAFFIC

(71) Applicant: Telefonaktiebolaget LM Ericsson (PUBL), Stockholm (SE)

(72) Inventors: Thorsten Lohmar, Aachen (DE); Ali El Essaili, Aachen (DE); Ann-Christine Eriksson, Enköping (SE); Mohamed Ibrahim, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 473 days.

(21) Appl. No.: 17/772,640

(22) PCT Filed: Oct. 30, 2019

(86) PCT No.: PCT/EP2019/079716
§ 371 (c)(1),
(2) Date: Apr. 28, 2022

(87) PCT Pub. No.: WO2021/083516
PCT Pub. Date: May 6, 2021

(65) Prior Publication Data
US 2022/0369156 A1    Nov. 17, 2022

(51) Int. Cl.
*H04W 76/15*    (2018.01)
*H04L 45/00*    (2022.01)
(Continued)

(52) U.S. Cl.
CPC ............. *H04W 76/15* (2018.02); *H04L 45/22* (2013.01); *H04L 45/302* (2013.01); *H04W 28/0268* (2013.01)

(58) Field of Classification Search
None
See application file for complete search history.

(56) References Cited

U.S. PATENT DOCUMENTS

2012/0069797 A1* 3/2012 Lim ................. H04W 52/0222
                                                370/328
2016/0192233 A1* 6/2016 Sarker ................ H04L 47/11
                                                370/236
(Continued)

FOREIGN PATENT DOCUMENTS

WO    2019 062783 A1    4/2019

OTHER PUBLICATIONS

3GPP TS 23.203 v16.1.0; Technical Specification; 3rd Generation Partnership Project; Technical Specification Group Services and System Aspects; Policy and charging control architecture (Release 16)—Jun. 2019.
(Continued)

*Primary Examiner* — Benjamin Lamont
(74) *Attorney, Agent, or Firm* — Weisberg I.P. Law, P.A.

(57) ABSTRACT

A service is utilized by a wireless communication device (10). For this service, the wireless communication device (10) simultaneously maintains a first data path (21) and a second data path (22) to a wireless communication network. The first data path (21) has a first QoS level, and the second data path (22) has a second QoS level that is different from the first QoS level. The wireless communication device (10) selects one of the first data path (21) and the second data path (22) for transmitting content of the service while the other of the first data path (21) and the second data path (22) is maintained in an inactive state.

19 Claims, 8 Drawing Sheets

(51) Int. Cl.
*H04L 45/302* (2022.01)
*H04W 28/02* (2009.01)

(56) References Cited

U.S. PATENT DOCUMENTS

2019/0260669 A1    8/2019  Zhu et al.
2020/0280871 A1*   9/2020  Khirallah .......... H04W 28/0257

OTHER PUBLICATIONS

PCT International Search Report issued for International application No. PCT/EP2019/079716—Jun. 22, 2020.
PCT Written Opinion of the International Searching Authority issued for International application No. PCT/EP2019/079716—Jun. 22, 2020.

* cited by examiner

SIMULTANEOUS DATA PATHS FOR QOS CONTROL OF SERVICE DATA TRAFFIC

PRIORITY

This nonprovisional application is a U.S. National Stage Filing under 35 U.S.C. § 371 of International Patent Application Serial No. PCT/EP2019/079716 filed Oct. 30, 2019 and entitled "SIMULTANEOUS DATA PATHS FOR QOS CONTROL OF SERVICE DATA TRAFFIC" which is hereby incorporated by reference in its entirety.

TECHNICAL FIELD

The present invention relates to methods for controlling data traffic in a wireless communication network and to corresponding devices, network nodes, systems, and computer programs.

BACKGROUND

Current wireless communication networks, e.g., based on the LTE (Long Term Evolution) or NR technology as specified by 3GPP ($3^{rd}$ Generation Partnership Project), support mechanisms for ensuring a certain QoS (Quality of Service) of data traffic. For example, the LTE technology allows for establishing a QoS bearer between a UE (user equipment) and the wireless communication network, to which data traffic of a certain service or application is mapped. In 3GPP TS 23.401 V16.4.0 (2019-09), the QoS bearer is referred to as a dedicated bearer, emphasizing that the bearer is dedicated to data traffic of a certain service or application. The QoS bearer is configured to provide certain treatment characteristics of the data traffic, e.g., with respect to processing priority, resource reservation, or scheduling, which in turn allows for achieving a desired QoS level, e.g., in terms of end-to-end delay, throughput, or reliability.

In the LTE technology, data traffic which to be mapped to a certain QoS bearer is identified using TFD (Traffic Flow Description) or TFT (Traffic Flow Template), which typically is based on an IP (Internet Protocol) 5-tuple, consisting of source IP address, destination IP address, source port number, destination port number, and protocol type. Further, a QCI (Quality of Service Class Indicator) is associated to each QoS bearer. The QCI determines the traffic handling priority, defines a PDB (Packet Delay Budged) and a PER (packet error rate). The PDB is a time window, during which a data packet should be transmitted. A lower PDB typically leads to an earlier scheduling of the data packet's transmission and a lower end-to-end delay. The PER defines the tolerable error rate in transmission of a data packet. A data packet which exceeds the configured PDB or PER of the QoS bearer is typically considered a lost data packet.

A QoS bearer may be configured as GBR (guaranteed bitrate) bearer. In this case, the QoS bearer is assigned a GBR to be provided by the wireless communication network. In an admission control process during establishment of the GBR bearer, the wireless communication network decides whether this GBR bearer can be supported. For example, when no sufficient capacity is available for supporting the desired GBR, it may be decided to not admit the establishment of the GBR bearer. As compared to a GBR bearer, a non-GBR bearer has no associated guaranteed bitrate. In this case, PDB, PER and traffic handling priority may be considered in the admission control process. As a result, only allow a certain number of non-GBR bearers may be admitted in a cell of the wireless communication network.

Procedures for activation and modification of a QoS bearer are for example described in section 5.4 of 3GPP TS 23.401 V16.4.0. Such procedures are typically initiated by a network based function referred to as PCRF (Policy and Charging Rules Function) and involve informing the nodes in the path of the bearer about the characteristics of the bearer.

As for example described in 3GPP TS 23.501 V16.2.0 (2019-09), in the NR technology QoS flows are utilized in a similar manner as the QoS bearers of the LTE technology for ensuring a certain QoS level of data traffic. In the following, the term "QoS data path" will be used to more generically refer to a QoS bearer, QoS flow, or similar type of data path which is controlled to offer a certain QoS level.

While a QoS data path offers the possibility to ensure a desired QoS level for data packet of a certain service or application, there are scenarios where it is desirable to dynamically change the QoS level. An example of such scenario is professional video production, specifically multi-camera event capturing, e.g., during live coverage of a sports event or entertainment event. In such scenarios, it is known to utilize multiple cameras which provide their respective captured video data through a wireless communication network to a production center, where a director selects among the individual video data to compile a program. In such situations, the utilization of QoS data paths allows for providing a desired quality of the video data utilized in the production center. On the other hand, only the video data which becomes part of the program is required as a high quality (HQ) video, while a lower quality (LQ) video may be sufficient for the video data which is merely used by the program director for making the selection. Configuring the QoS data path of each camera to meet the demands of the high quality video may result in a waste of resources due, because the HQ video is actually required for only one of the cameras. On the other hand, dynamically adapting the QoS data paths according to whether a HQ video or a LQ video needs to be transmitted is a rather complex process involving multiple nodes of the wireless communication network, resulting in a rather slow and resource consuming adaptation process.

Accordingly, there is a need for techniques which allow for efficiently controlling data traffic of a service with respect to dynamically providing different QoS levels.

SUMMARY

According to an embodiment, a method of controlling data traffic in a wireless communication network is provided. According to the method, a certain service is utilized by a wireless communication device. For this service, the wireless communication device simultaneously maintains a first data path and a second data path to the wireless communication network. The first data path has a first QoS level, and the second data path has a second QoS level that is different from the first QoS level. The wireless communication device selects one of the first data path and the second data path for transmitting content of the service while the other of the first data path and the second data path is maintained in an inactive state.

According to a further embodiment, a method of controlling data traffic in a wireless communication network is provided. The method comprises that, for a service utilized by a wireless communication device, a node of the wireless communication network simultaneously maintains a first data path and a second data path to the wireless communication device. The first data path has a first QoS level and the second data path has a second QoS level that is different from the first QoS level. The node receives content of the service from one of the first data path and the second data path while the other of the first data path and the second data path is maintained in an inactive state.

According to a further embodiment, a method of controlling data traffic in a wireless communication network is provided. The method comprises that, for a service utilized by a group of wireless communication devices and for each wireless communication device of the group, a node of the wireless communication network authorizes establishment of a corresponding first data path and a corresponding second data path to the wireless communication network. The first data paths have a first QoS level and the second data paths have a second QoS level that is different from the first QoS level. Further, the node configures QoS rules for the first data paths and the second data paths. Authorizing of establishment of the first data paths and the second data paths and/or said configuring of the QoS rules is based on a policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state.

According to a further embodiment, a wireless communication device is provided. The wireless communication device is configured to, for a service utilized by the wireless communication device, simultaneously maintain a first data path and a second data path to a wireless communication network. The first data path has a first QoS level and the second data path has a second QoS level that is different from the first QoS level. Further, the wireless communication device is configured to select one of the first data path and the second data path for transmitting content of the service while the other of the first data path and the second data path is maintained in an inactive state.

According to a further embodiment, a wireless communication device is provided. The wireless communication device comprises at least one processor and a memory. The memory contains instructions executable by said at least one processor, whereby the wireless communication device is operative to, for a service utilized by the wireless communication device, simultaneously maintain a first data path and a second data path to a wireless communication network. The first data path has a first QoS level and the second data path has a second QoS level that is different from the first QoS level. Further, the memory contains instructions executable by said at least one processor, whereby the wireless communication device is operative to select one of the first data path and the second data path for transmitting content of the service while the other of the first data path and the second data path is maintained in an inactive state.

According to a further embodiment, a node for a wireless communication network is provided. The node is configured to, for a service utilized by a wireless communication device, simultaneously maintain a first data path and a second data path to the wireless communication device. The first data path has a first QoS level and the second data path has a second QoS level that is different from the first QoS level. Further, the node is configured to receive content of the service from one of the first data path and the second data path while the other of the first data path and the second data path is maintained in an inactive state.

According to a further embodiment, a node for a wireless communication network is provided. The node comprises at least one processor and a memory. The memory contains instructions executable by said at least one processor, whereby the node is operative to, for a service utilized by a wireless communication device, simultaneously maintain a first data path and a second data path to the wireless communication device. The first data path has a first QoS level and the second data path has a second QoS level that is different from the first QoS level. Further, the memory contains instructions executable by said at least one processor, whereby the node is operative to receive content of the service from one of the first data path and the second data path while the other of the first data path and the second data path is maintained in an inactive state.

According to a further embodiment, a node for a wireless communication network is provided. The node is configured to, for a service utilized by a group of wireless communication devices and for each wireless communication device of the group, authorize establishment of a corresponding first data path and a corresponding second data path to the wireless communication network. The first data paths have a first QoS level and the second data paths have a second QoS level that is different from the first QoS level. Further, the node is configured to configure QoS rules for the first data paths and the second data paths. Authorizing of establishment of the first data paths and the second data paths and/or said configuring of the QoS rules is based on a policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state.

According to a further embodiment, a node for a wireless communication network is provided. The node comprises at least one processor and a memory. The memory contains instructions executable by said at least one processor, whereby the node is operative to, for a service utilized by a group of wireless communication devices and for each wireless communication device of the group, authorize establishment of a corresponding first data path and a corresponding second data path to the wireless communication network. The first data paths have a first QoS level and the second data paths have a second QoS level that is different from the first QoS level. Further, the memory contains instructions executable by said at least one processor, whereby the node is operative to configure QoS rules for the first data paths and the second data paths. Authorizing of establishment of the first data paths and the second data paths and/or said configuring of the QoS rules is based on a policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state.

According to a further embodiment of the invention, a computer program or computer program product is provided, e.g., in the form of a non-transitory storage medium, which comprises program code to be executed by at least one processor of a wireless communication device. Execution of the program code causes the wireless communication device to, for a service utilized by the wireless communication device, simultaneously maintain a first data path and a second data path to a wireless communication network. The first data path has a first QoS level and the second data path has a second QoS level that is different from the first QoS level. Further, execution of the program code causes the wireless communication device to select one of the first data path and the second data path for transmitting content of the service while the other of the first data path and the second data path is maintained in an inactive state.

According to a further embodiment of the invention, a computer program or computer program product is provided, e.g., in the form of a non-transitory storage medium, which comprises program code to be executed by at least one processor of a node for a wireless communication network. Execution of the program code causes the node to, for a service utilized by a wireless communication device, simultaneously maintain a first data path and a second data path to the wireless communication device. The first data path has a first QoS level and the second data path has a second QoS level that is different from the first QoS level. Further, execution of the program code causes the node to receive content of the service from one of the first data path and the second data path while the other of the first data path and the second data path is maintained in an inactive state.

According to a further embodiment of the invention, a computer program or computer program product is provided, e.g., in the form of a non-transitory storage medium, which comprises program code to be executed by at least one processor of a node for a wireless communication network. Execution of the program code causes the node to, for a service utilized by a group of wireless communication devices and for each wireless communication device of the group, authorize establishment of a corresponding first data path and a corresponding second data path to the wireless communication network. The first data paths have a first QoS level and the second data paths have a second QoS level that is different from the first QoS level. Further, execution of the program code causes the node to configure QoS rules for the first data paths and the second data paths. Authorizing of establishment of the first data paths and the second data paths and/or said configuring of the QoS rules is based on a policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling data traffic in a wireless communication network, in particular with respect to providing a certain QoS for the data traffic. The wireless communication network may for example be based on the LTE radio technology or the NR radio technology as specified by 3GPP. However, it is noted that the illustrated concepts could also be applied to other radio technologies, e.g., a UMTS (Universal Mobile Telecommunications System) or a CDMA2000 technology.

In the illustrated concepts, a wireless communication device, in the following referred to as UE, which utilizes a certain service, e.g., a service for streaming video data, establishes multiple data paths to the wireless communication network, which are simultaneously maintained to be selectively utilized for transmitting content of the service. The data paths each offer a different QoS level, e.g., in terms of GBR or delay. In the following, the data paths are thus also referred to as QoS data paths. The QoS data paths may correspond to dedicated bearers as described in 3GPP TS 23.401 V16.4.0 (2019-09) or to QoS flows as described in 3GPP TS 23.501 V16.2.0 (2019-09). Depending on the QoS level currently required for transmitting the content, the UE switches between the different QoS data paths, so that the QoS level provided for transmitting the content can be quickly adapted, without requiring a reconfiguration of the QoS data paths.

Figure 1:
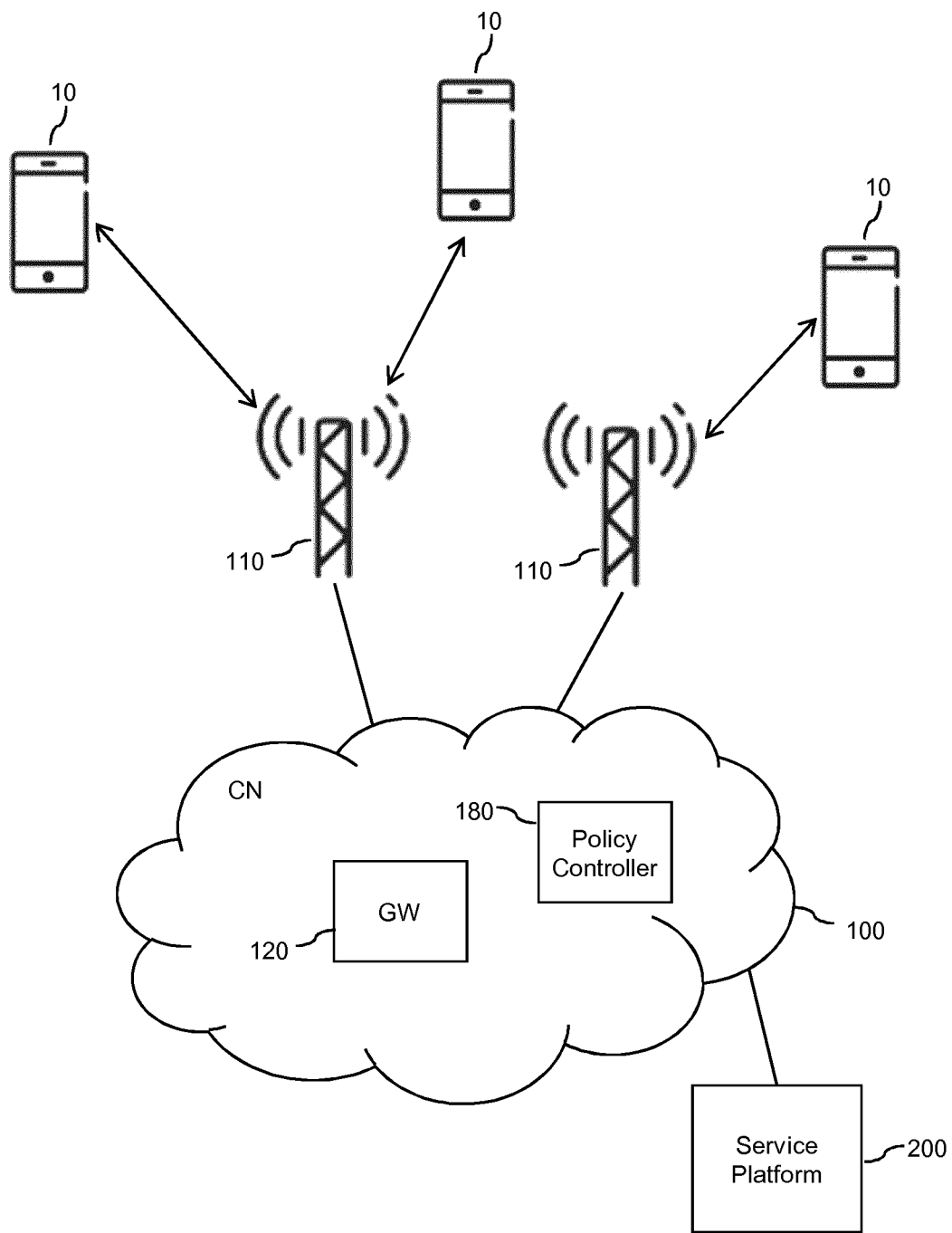
FIG. 1 schematically illustrates an exemplary wireless communication scenario in data traffic may be controlled according to an embodiment of the invention.

FIG. 1 illustrates an exemplary scenario involving communication in the wireless communication network. In particular, FIG. 1 shows various UEs 10, which may transmit data traffic to the wireless communication network and also received data traffic from the wireless communication network, as illustrated by double-headed arrows. Further, FIG. 1 shows access nodes 110 of the wireless communication network, e.g., an eNB of the LTE technology or a gNB of the NR technology. The communication between the UEs 10 and the wireless communication network occurs through radio links established between the UEs 10 and the access nodes 110. The access nodes 110 are examples of RAN (Radio Access Network) nodes which are responsible for processes like maintaining the radio links, controlling transmissions on the radio links, admission control for the radio links, or scheduling radio transmissions on the radio links.

Further, FIG. 1 illustrates a core network (CN) 100 of the wireless communication network. The CN 100 is illustrated as including a GW (gateway) 120 and a policy controller 180. The GW 120 is responsible for handling user data traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network. The GW 120 may for example correspond to a PGW (Packet Data Gateway) of the LTE technology or to a UDF (User Data Function) of the NR technology. The policy controller 180 may in turn be responsible for controlling the user data traffic, in particular with respect to QoS. The policy controller 180 may for example correspond to a PCRF of the LTE technology or to a PCF (Policy Control Function) of the NR technology.

As illustrated by double-headed arrows, the access nodes 110 may send DL (downlink) transmissions to the UEs 10, and the UEs 10 may send UL (uplink) transmissions to the access node 110. The DL transmissions and UL transmissions may be used to provide various kinds of services to the UEs 10, e.g., a voice service, a multimedia service, or a data service. Such services may be hosted in the CN 100, e.g., by a corresponding network node. Further, such services may be hosted externally, e.g., by an AF (application function) connected to the CN 100. By way of example, FIG. 1 illustrates a service platform 200 provided outside the wireless communication network. The service platform 200 could for example connect through the Internet or some other wide area communication network to the CN 100. The service platform 200 may be based on a server or a cloud computing system. The service platform 200 may include or be associated with one or more AFs that enable interaction of the service platform 200 with the CN 100. The service platform 200 may provide one or more services to the UEs 10, corresponding to one or more applications. These services or applications may generate the user data traffic conveyed by the DL transmissions and/or the UL transmissions between the access node 100 and the respective UE 10. Accordingly, the service platform 200 may include or correspond to the above-mentioned network destination and/or network source for the user data traffic. It is noted that at least a part of the service platform 200 could also be provided in the CN 100.

Figure 2A:
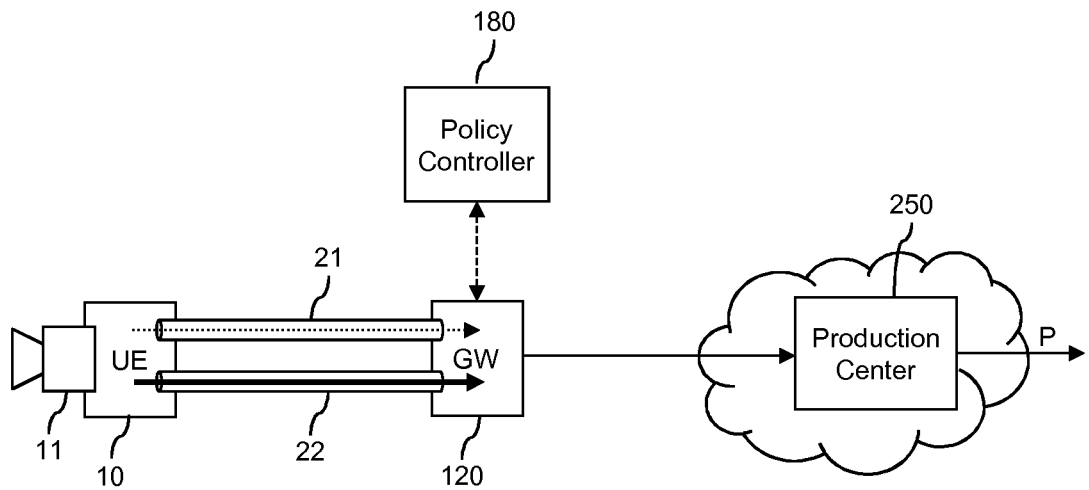
FIG. 2A schematically illustrates an example involving usage of two simultaneous data paths according to an embodiment of the invention.

FIG. 2A illustrates an exemplary scenario which is based on the concepts as outlined above. In particular, FIG. 2A illustrates a scenario in which a UE 10 transmits live video data captured by a camera 11 to a production center 250. The UE 10 may correspond to one of the UEs 10 shown in FIG. 1. The video data may for example be transmitted on the basis of a streaming service. The camera 11 and the UE 10 may be part of a single integrated device, e.g., a video camera equipped with a wireless communication module or modem (corresponding to the UE 10), or a UE 10 equipped with an on-board camera corresponding to the camera 11, e.g., a camera drone. Further, it is also possible that the UE 10 and the camera 11 are separate devices coupled to each other by a data link to allow transmitting the video data captured by the camera 11 through the UE 10.

The production center 250 may be based on one or more AFs interacting with the wireless communication network to receive the live video data from the UE 10, e.g., AFs hosted by the service platform 200 of FIG. 1. At least a part of the production center 250 could also be implemented by a cloud production center and/or equipment of an OB (Outside Broadcast) truck. The latter variant may for example be useful in the case of producing a live coverage program of a sports event or various kinds of outdoor events, where the OB truck allows moving the equipment to the location of the event.

As illustrated, the UE 10 maintains a first QoS data path 21 and a second QoS data path 22 to the GW 120. The QoS data paths 21, 22 may extend through one or more intermediate nodes (not illustrated in FIG. 2A), e.g., through an access node 110 and/or one or more transport nodes. The QoS data paths 21, 22 may each be implemented by utilizing a tunneling protocol layer for establishing a data tunnel terminated at the UE 10 and at the GW 120.

In case of outside broadcast center productions (like sports matches), the program director uses an OB Truck as bases. All video production equipment is mounted inside the truck to allow moving the equipment easily.

The two QoS Bearers may be configured as follows: The first QoS data path 21 is configured with a low QoS level to carry LQ video, e.g., a video stream of 5 Mbps or less. For the first QoS data path 21, the GBR is set to a rather low value. Further, the PDB and/or the PER may each be set to a rather high value. The second QoS data path 22 is configured with a high QoS level to carry HQ video, e.g., a video stream of 10 Mbps or more. For the second QoS data path 22, the GBR is set to a lower value than for the first QoS data path 21. Further, the PDB and/or the PER may be set to a lower value than for the first QoS data path 21. At any time, only one of the first QoS data path 21 and the second QoS data path 22 is active for the UE 10, while the other QoS data path 21, 22 is maintained in an inactive state. If the HQ video is required in the production center 250, the UE 10 may switch to transmitting the video data on the second QoS data path 22 and maintain the first QoS data path in the inactive state. If only the LQ video is required in the production center 250, the UE 10 may switch to transmitting the video data on the first QoS data path 21 and maintain the second QoS data path 22 in the inactive state. Here, the inactive state may involve that configuration and context data of the QoS data path 21, 22 is kept at each node of the QoS data path 21, 22, but no data is being transmitted on the inactive QoS data path 21, 22. By keeping the configuration and context data of the inactive QoS data path 21, 22, the inactive QoS data path 21, 22 may be quickly activated if needed.

Further, FIG. 2A illustrates the policy controller 180. The policy controller 180 may be responsible for managing and controlling the QoS data paths 21, 22, e.g., with respect to establishment, configuration, and termination. In particular, the policy controller 180 may authorize establishment of the QoS data paths 21, 22, and configure a corresponding set of QoS rules for each of the QoS data paths 21, 22. The policy controller 180 may then provide the QoS rules to the GW 120, and the GW 120 may further indicate the QoS rules to the UE 10 and to one or more intermediate nodes on the QoS data paths 21, 22. Here, the policy controller 180 may in particular take into account that, at a given time, only one of the QoS data paths 21, 22 is allowed to be used for transmitting content, resulting in the QoS data paths 21, 22 requiring less resources than two QoS data paths of the same characteristics which are allowed to be simultaneously used for transmission of content.

As can be seen, in the scenario of FIG. 2A it is possible to ensure a desired QoS level for the transmitted video data and to adapt the QoS level in a dynamic manner. As further explained below, this may for example be useful in the case of multi-camera capturing, i.e., when utilizing multiple cameras in a similar manner as the camera 11 to provide their respective captured video data through a corresponding UE to the production center 250, where a director selects among the individual video data to compile a program P. In such situations, the utilization of multiple simultaneously maintained QoS data paths for each camera facilitates switching between different cameras as a source of HQ video, while the other camera(s) are used as sources of LQ video.

For example, in a live TV production scenario, e.g., for a sports event or entertainment event, multiple cameras may capture the live scene from different perspectives or different parts of the live scene. The director can see the output of all available cameras and can decide which of the cameras feeds to utilize in the program P at a given time and select this camera as the source of HQ video, so that the program P presented to the audience has a high resulting quality. For making this decision, the LQ video is sufficient. The LQ video data received from the other cameras may be discarded or recorded. During production of the program P, the director can dynamically switch between the cameras so that different cameras are selectively used as the source of HQ video. Accordingly, when the director decides to switch from one camera to another camera, then the newly selected camera should transmit the HQ video through the second QoS data path 22, while the other cameras switch to transmitting the LQ video on the first QoS data path 21.

When assuming that four cameras are utilized and the HQ video is a 10 Mbps video stream and the LQ video is a 2 Mbps stream, a total capacity 16 Mbps is needed for all cameras. The QoS admission control process may accept establishment of the QoS data paths for all the cameras, assuming that resources for an overall capacity of 16 Mbps are required, as compared to a required overall capacity of 40 Mbps if the QoS data paths 22 suitable for the HQ video would be requested for simultaneous usage by all cameras.

The mapping of the transmitted content to the QoS data paths 21, 22 may be performed on the basis of IP 5-tuples of data packets conveying the transmitted content. In particular, packet filters operating on the basis of the IP 5-tuples may be used for directing the transmitted content to the desired QoS data path. The application which generates the data traffic of the service may be controlled to provide the data packets with the IP 5-tuples needed to direct the content to the desired bearer. In the illustrated example, the application executed on the UE 10 for transmitting the video stream with the video data captured by the camera will provide the data packets of the video stream with a first IP 5-tuple if the first QoS data path 21 is selected for transmission of the LQ video, and will provide the data packets of the video stream with a second IP 5-tuple if the second QoS data path 22 is selected for transmission of the HQ video. The application may also be responsible for encoding the video data captured by the camera to either correspond to the LQ video or to the HQ video. Alternatively, the camera 11 could also be configured to output both the LQ video or to the HQ video, and the application executed on the UE 10 could select between these different outputs of the camera. The first IP 5-tuple and the second IP 5-tuple may for example differ with respect to source port and/or destination port.

The configuration of the different IP 5-tuples may depend on the utilized transport protocol and/or higher layer protocols of the data traffic. In case of using UDP (User Datagram Protocol) as the transport protocol, e.g., in the case of streaming the content based on RTP (Realtime Transport Protocol), the UE 10 may distinguish between the different QoS data paths 21, 22 by using different destination ports. In the case of TCP (Transmission Control Protocol), e.g., in the case of streaming the content based on HTTP (Hypertext Transfer Protocol) or HTPPS (Hypertext Transfer Protocol Secure) the destination port is typically the same for different TCP connections. For example, when an HTTP (Hypertext Transfer Protocol) server is accepting HTTP connections, the destination port is typically port 80, and for HTTPS (Hypertext Transfer Protocol Secure) the destination port is typically 443. In this case, the UE 10 may establish a corresponding TCP session for each of the QoS data paths and uses the same destination port, but different source ports for these TCP connections. Hence, it can be achieved that the IP 5-tuples for the same UE 10 and the same service can be different with respect to their source port.

In some scenarios, the production center 250 receiving the content may be aware of the different IP 5-tuples utilized for transmitting the content from the UE 10 and recognize that the content corresponds to the same service and originates from the same UE 10. In other scenarios, it may be desirable that the usage of the different IP 5-tuples is transparent to the production center 250. An example of a setup which allows for keeping the usage of the different IP 5-tuples is transparent to the production center 250 is illustrated in FIG. 2B.

Figure 2B:
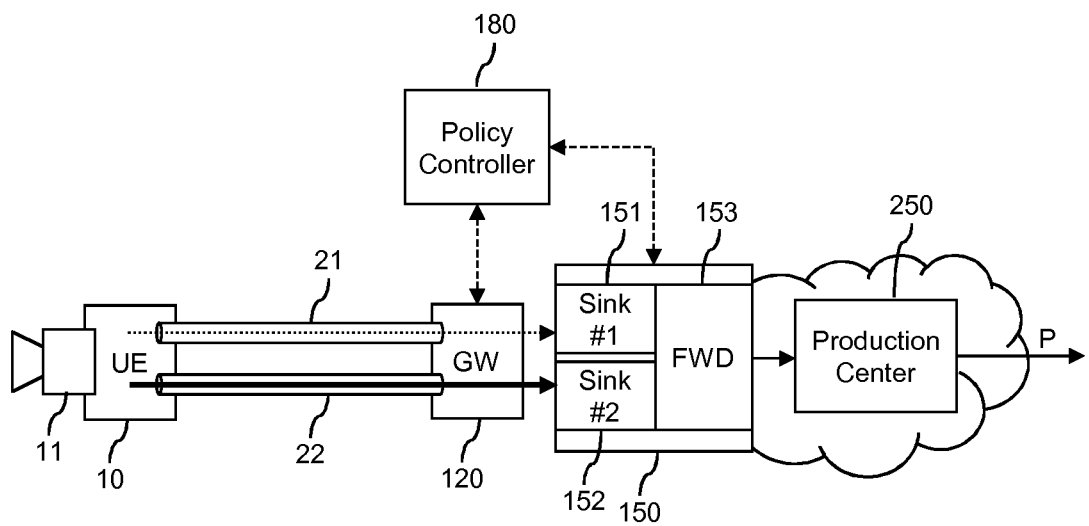
FIG. 2B schematically illustrates a further example involving usage of two simultaneous data paths according to an embodiment of the invention.

As illustrated, the setup of FIG. 2B additionally includes a proxy node 150 arranged between the GW 120 and the production center 250. The proxy node 150 is provided with a data sink for each of the different utilized IP 5-tuples, in particular a first data sink 151 (Sink #1) for the first QoS data path 21, a second data sink 152 for the second QoS data path 22. Further, the proxy node 150 is provided with a forwarding stage 153. The data sinks 151, 152 receive the data traffic from the respective QoS data path 21, 22. In the illustrated example, the data sink 151 receives the data traffic from the first QoS data path 21, and the data sink 152 receives the data traffic from the second QoS data path 22. The forwarding stage 153 forwards the data traffic received by the data sinks 151, 152, using the same IP 5-tuple in the forwarded data traffic, irrespective by which data sink 151, 152 the data traffic was received. The IP 5-tuple used in the forwarded data traffic may for example correspond to one of the different IP 5-tuples used for directing the transmitted content to the desired QoS data path 21, 22. However, other IP 5-tuples could be used as well. From the perspective of the production center 250, the forwarding stage 250 may thus hide the fact that two different traffic flows are used for conveying the content from the UE 10 to the GW 120. Accordingly, the proxy node 150 may translate between two transport sessions used between the UE 10 and the GW 120 and one transport session used between the GW 120 and the production center 250.

It is noted that while FIG. 2B illustrates the proxy node 150 as an element which is separate from the GW 120 and the production center 250, it would also be possible to implement the proxy node 150 within the GW 120, e.g., at an output stage of the GW 120, or within the production center 250, e.g., at an input stage of the production center 250.

For the above processes, the policy controller 180 may be provided with information about configuration of the group of UEs 10, e.g., concerning number of UEs 10 or cameras 11, or concerning camera capabilities, such as available video qualities. Further, the policy controller 180 may provide other nodes of the wireless communication network with the information about configuration of the group of UEs 10, e.g., to the GW 120, the proxy node 150, or RAN nodes, such as the above-mentioned access nodes 110. The information may also be pre-configured and/or provided during session establishment, e.g., utilizing a Framework for Live Uplink Streaming (FLUS) as described in 3GPP TR 26.939 V16.1.0 (2019-09). The configuration of the group or group members may be updated if needed. In the RAN based admission control process, e.g., implemented by the access nodes 110, or in CN based authorization processes, e.g., implemented by the policy controller 180, the current group configuration may be considered. Further, group members may be added or removed, and the changed configuration of the group be taken into account when admitting requests related to the QoS data paths 21, 22, configuring the QoS data paths 21, 22, and/or authorizing establishment of the QoS data paths 21, 22.

The wireless communication network may monitor the usage of the QoS data paths according to the configured QoS rules and the above policy of utilizing the QoS data paths. In particular, a monitoring scheme may be utilized which is aware the group of QoS data paths configured for the group of UEs 10. The monitoring scheme may in particular take into account that only a single UE 10 is authorized to use the respective second QoS data path 22 having the higher QoS level, while the other UEs 10 may use the first QoS data path 21 having the lower QoS level. The monitoring scheme may involve collecting data at the GW 120 and/or at one or more other nodes on the QoS data paths 21, 22. The collected data may then be reported to the policy controller 180 and then be taken account in the admission control process or when configuring the QoS rules.

The multiple simultaneously maintained QoS data paths 21, 22 and their utilization policy may also be taken into account in various other processes. For example, a process of scheduling radio transmissions of the UE 10, such as implemented by one of the access nodes 110, may be aware of the multiple QoS data paths 21, 22 and which of the QoS data paths 21, 22 is inactive.

Figure 3A:
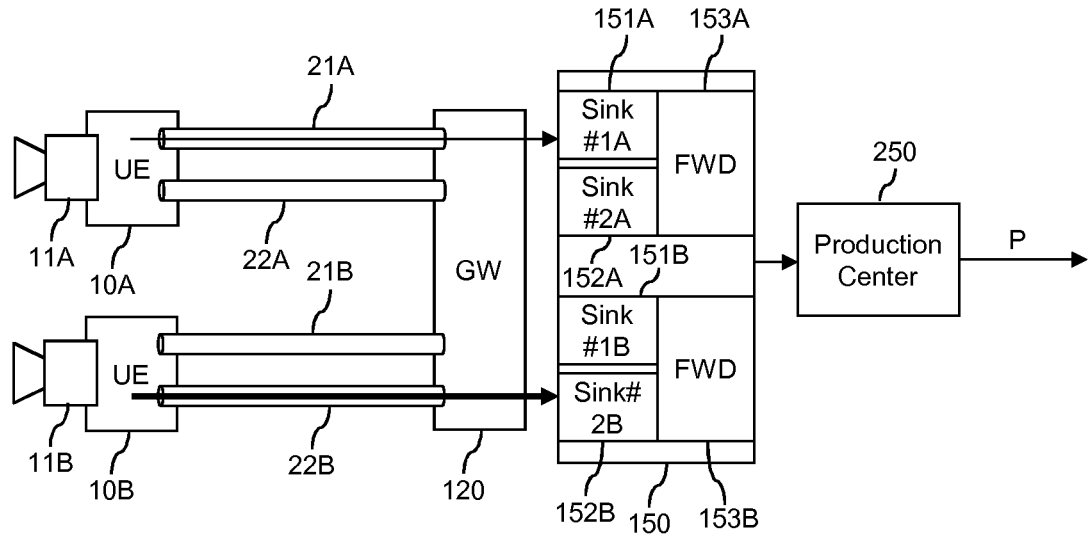
FIGS. 3A and 3B schematically illustrate coordinated usage of two simultaneous data paths by in a group of devices, according to an embodiment of the invention.
Figure 3B:
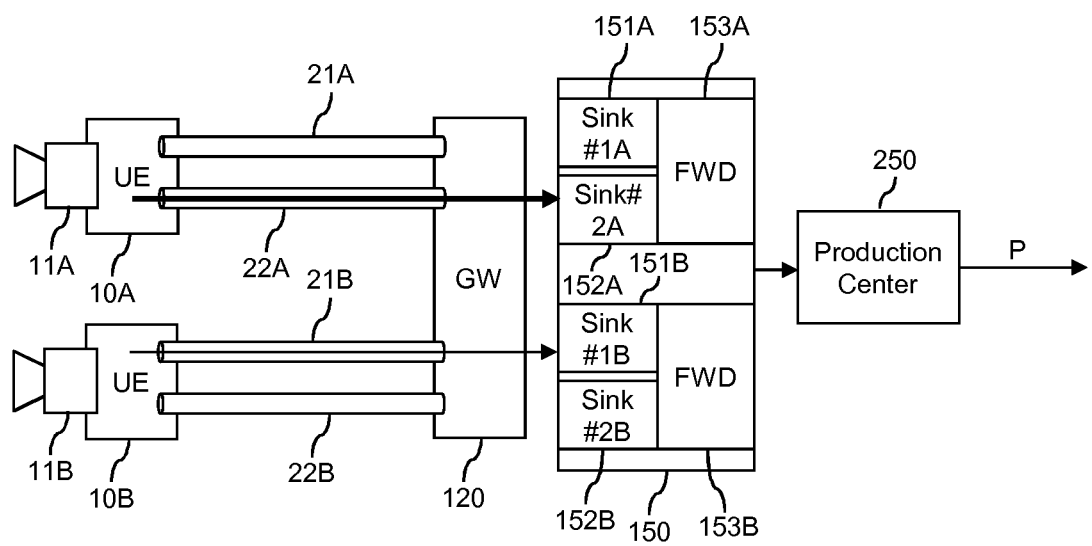

FIGS. 3A and 3B schematically illustrate switching between the QoS data paths in an exemplary scenario involving a first UE 10A and a second UE 10B. Here, it is noted that each of the UEs 10A, 10B may operate as explained above for the UE 10. The first UE 10A is associated with a first camera 10A, and the second UE 10B is associated with a second camera 10B.

In the scenario of FIGS. 3A and 3B, the proxy node 150 is provided with a first data sink 151A, 151B and a second data sink 152A, 152B for each of the UEs 10A, 10B. Specifically, a first data sink 151A (Sink #1A) and a second data sink 152A (Sink #2A) are provided for the first UE 10A, and a first data sink 151B (Sink #2A) and a second data sink 152B (Sink #2B) are provided for the second UE 10B. Further, the proxy node 150 is provided with a respective forwarding stage 153A, 153B for each of the UEs 10A, 10B. Specifically, a first forwarding stage 153A is provided for the first UE 10A, and a second forwarding stage 153B is provided for the second UE 10B.

The scenario of FIG. 3A illustrates a first time period during production of the program P, in which the HQ video from the camera 11B is utilized in the program P produced at the production center 250, e.g., in accordance with a decision of the director producing the program P. In the scenario of FIG. 3A, the camera 11B provides the HQ video through the UE 10B and the QoS data path 22B to the GW 120. From the GW 120 the HQ video is further conveyed to the second data sink 152B, from where the forwarding stage 153B forwards the HQ video to the production center 250. At the same time, the camera 11A provides the LQ video through the UE 10A and the QoS data path 21A to the GW 120. From the GW 120 the LQ video is further conveyed to the corresponding first data sink 151A, from where the corresponding forwarding stage 153A forwards the HQ video to the production center 250. In the production center 250, the HQ video may then be utilized as content of the program P, whereas the LQ video may be utilized as a basis for deciding which of the cameras 11A, 11B is to be used as the HQ video source in the future. At a certain time, the director may decide to switch to the camera 11A as the HQ video source, resulting in a scenario as illustrated in FIG. 3B.

The scenario of FIG. 3B illustrates a second time period during production of the program P, in which the HQ video from the camera 11A is utilized in the program P produced at the production center 250, e.g., in accordance with a decision of the director producing the program P. In the scenario of FIG. 3B, the camera 11A provides the HQ video through the UE 10A and the QoS data path 22A to the GW 120. From the GW 120 the HQ video is further conveyed to the second data sink 152A, from where the forwarding stage 153A forwards the HQ video to the production center 250. At the same time, the camera 11B provides the LQ video through the UE 10B and the QoS data path 21B to the GW 120. From the GW 120 the LQ video is further conveyed to the corresponding first data sink 151B, from where the corresponding forwarding stage 153B forwards the HQ video to the production center 250. In the production center 250, the HQ video from the camera 11A may then be utilized as content of the program P, whereas the LQ video from the camera 11B may be utilized as a basis for deciding which of the cameras 11A, 11B is to be used as the HQ video source in the future. At a certain time, the director may decide to switch back to the camera 11B as the HQ video source, returning to a scenario as illustrated in FIG. 3A.

Since no reconfiguration of the QoS data paths 21A, 22A, 21B, 22B is required when switching between the scenarios of FIGS. 3A and 3B, the switching can be accomplished quickly and without excessive signalling overhead. For triggering the switching at the UEs 10A, 10B, a control signal from the production center 250 to the UEs 10A, 10B can be utilized. The control signal can for example be transmitted on a service layer backchannel for conveying data traffic from the production center 250 to the UEs 10A, 10B. Alternatively or in addition, the control signal could be conveyed in control data traffic from the production center 250 to the UEs 10A, 10B, e.g., in transport layer acknowledgement data packets.

While the example of FIGS. 3A and 3B illustrates a centralized deployment of the data sinks 151A, 152A, 151B, 152B and of the forwarding stages 153A, 153B in a single proxy node 150, other deployments are possible as well, e.g., with only the data sinks 151A, 152A, 151B, 152B and forwarding stage 153A, 153B corresponding to the same UE 10A, 10B being co-located. In such distributed deployment, the data sinks 151A, 152A and the forwarding stage 153A could be arranged in a first proxy node, while the data sinks 151B, 152B and the forwarding stage 153B are arranged in a second proxy node which is separate from the first proxy node. Such distributed deployment, for example be beneficial in scenarios where the first UE 10 a and the second UE 10 B are not connected to the same GW 120 as in the illustrative examples, but rather connected to separate GWs. In a distributed deployment, the data sinks 151A, 152A, 151B, 152B and corresponding forwarding stages 153A, 153B could also be implemented as part of the corresponding GW. Still further, all the data sinks 151A, 152A, 151B, 152B and forwarding stages 153A, 153B could also be centralized in the production center 250.

Figure 4:
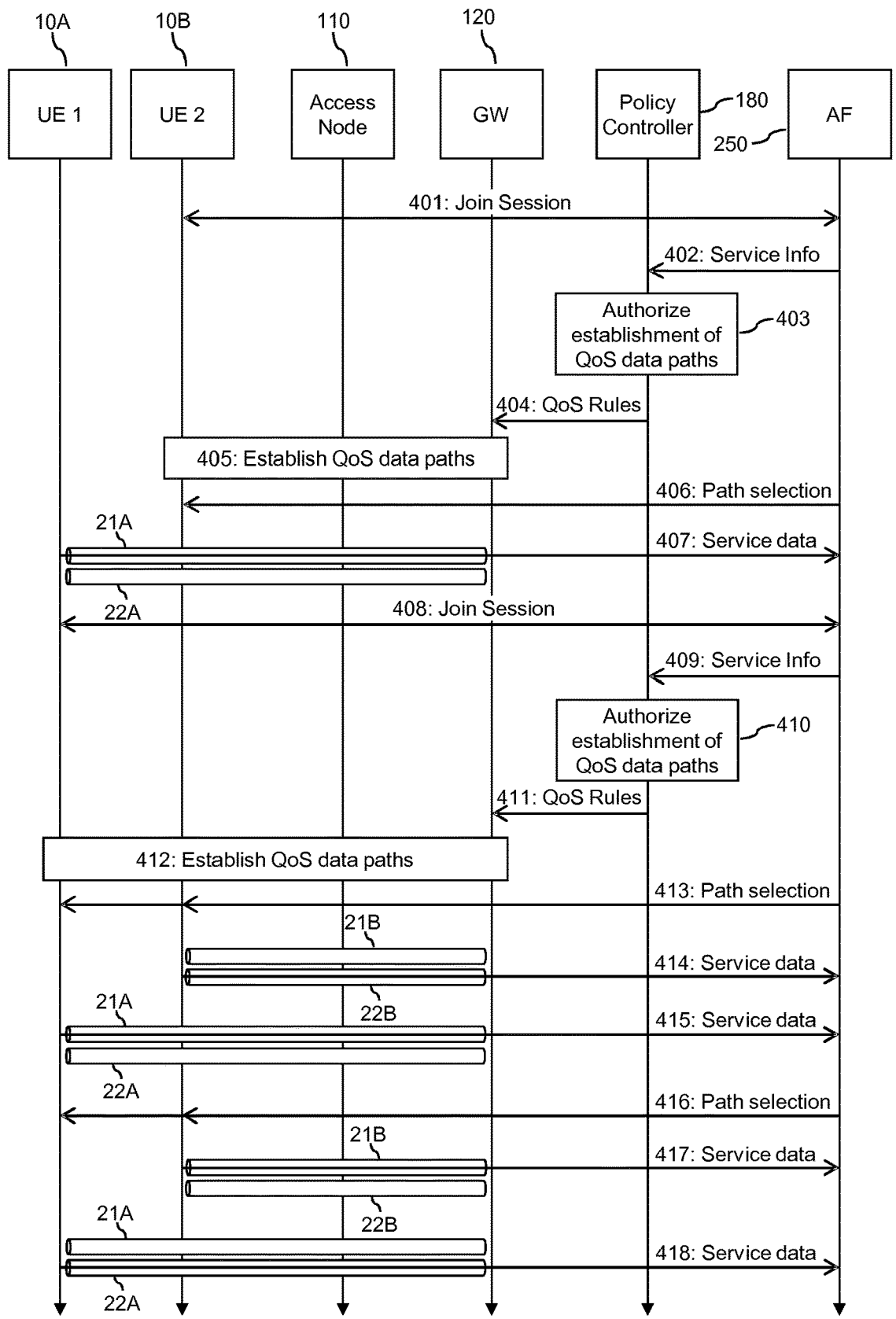
FIG. 4 shows an example of processes according to an embodiment of the invention.

FIG. 4 illustrates exemplary processes which are based on the concepts as outlined above. The processes of FIG. 4 involve UEs 10A, 10B (UE 1 and UE 2), an access node 110, a GW 120, a policy controller 180, and an AF 250. The UEs 10A, 10B may for example correspond to the UEs 10A, 10B in the example of FIGS. 3A and 3B. The access node 110 may for example correspond to the access node 110 in the example of FIG. 1. The GW 120 may for example correspond to the GW 120 in the examples of FIGS. 1, 2A, 2B, 3A, and 3B. The policy controller 180 may for example correspond to the policy controller and the examples of FIGS. 1, 2A, and 2B. The AF 250 may for example correspond to the production center 250 in the examples of FIGS. 2A, 2B, 3A, and 3B.

In the processes of FIG. 4, it is assumed that the UE 10A joins a group service session with the AF 250, as indicated by signaling exchange 401. The group service session may for example involve conveying video data and/or other multimedia data from the UEs 10A, 10B of the group to the AF 250. For example as mentioned above, the UEs 10A, 10B may convey video data to the AF 250, using different video qualities. In the following, it is assumed that each UE 10 A, 10 B can either provide high quality (HQ) service data or low-quality (LQ) service data to the AF 250, e.g. HQ video or LQ video as in the above-described examples.

In response to the UE 10A joining the group service session, the AF 250 provides service information 402 to the policy controller 180. The service information 402 may for example identify the UE 10A, the type of group service, the group service session, and the required QoS levels.

As indicated by block 403, the policy controller 180 then authorizes the establishment of multiple QoS data paths 21A, 22A for the UE 10A. Further, the policy controller 180 provides QoS rules 404 for the QoS data paths 21A, 22A to the GW 120. As indicated by block 405, the GW 120 then initiates establishment of the QoS data paths 21A, 22A between the UE 10A and the GW 120. The processes of block 405 may involve signaling exchange by the UE 10A, the access node 110, and the GW 120. Further, the processes of block 405 may involve admission control processes at the access node 110 which take into account the provided QoS rules and available capacity in the RAN. Further, the admission control processes may take into account a policy for utilization of the QoS data paths 21A, 22A, according to which at a given time only one UE participating the group service session is allowed to utilize the QoS data path with the high QoS level for the transmission of content, while the other UEs in the group utilize the other QoS data path with the low QoS level. The admission control processes may involve admitting or rejecting requests related to the QoS data paths 21A, 22A. The signaling exchange of block 405 may also be utilized to inform the access node 110 about configuration of the group of UEs participating the group service session, e.g., concerning number of UEs or cameras, or concerning camera capabilities, such as available video qualities. Such information could for example be provided from the CN, e.g., from the AF 250 via the policy controller 180 to the GW 120, and then be further distributed by the GW 120 during the signaling exchange of block 405.

At a given time, e.g., in response to a decision process as the AF 250, the AF 250 provides a path selection signal 406 to the UE 10A. The path selection signal 406 may for example be transmitted as a service layer command of the group service session, or may be conveyed as part of lower layer control signaling, e.g., in transport layer acknowledgments transmitted from the AF to the UE 10A.

In the example of FIG. 4 it is assumed that the path selection signal 406 causes the UE 10A to select the QoS data path 21A. As a consequence, the UE 10A then transmits LQ service data 407 through the QoS data path 21A to the AF 250.

In the example of FIG. 4, then the UE 10B joins the group service session with the AF 250, as indicated by signaling exchange 408. In response to the UE 10B joining the group service session, the AF 250 provides service information 409 to the policy controller 180. The service information 409 may for example identify the UE 10B, the type of group service, the group service session, and the required QoS levels.

As indicated by block 403, the policy controller 180 then authorizes the establishment of multiple QoS data paths 21B, 22B for the UE 10B. Further, the policy controller 180 provides QoS rules 411 for the QoS data paths 21B, 22B to the GW 120. As indicated by block 412, the GW 120 then initiates establishment of the QoS data paths 21B, 22B between the UE 10B and the GW 120. The processes of block 412 may involve signaling exchange by the UE 10B, the access node 110, and the GW 120. Further, the processes of block 412 may involve admission control processes at the access node 110 which take into account the provided QoS rules and available capacity in the RAN. Further, the admission control processes may take into account a policy for utilization of the QoS data paths 21B, 22B, according to which at a given time only one UE participating the group service session is allowed to utilize the QoS data path with the high QoS level for the transmission of content, while the other UEs in the group utilize the other QoS data path with the low QoS level. The admission control processes may involve admitting or rejecting requests related to the QoS data paths 21B, 22B. The signaling exchange of block 412 may also be utilized to inform the access node 110 about configuration of the group of UEs participating the group service session, e.g., concerning number of UEs or cameras, or concerning camera capabilities, such as available video qualities. Such information could for example be provided from the CN, e.g., from the AF 250 via the policy controller 180 to the GW 120, and then be further distributed by the GW 120 during the signaling exchange of block 412.

At a given time, e.g., in response to a decision process as the AF 250, the AF 250 provides a further path selection signal 413 to the UE 10A and to the UE 10B. The path selection signal 413 may for example be transmitted as a service layer command of the group service session, or may be conveyed as part of lower layer control signaling, e.g., in transport layer acknowledgments transmitted from the AF to the UEs 10A, 10B. It is also possible to use a broadcast mode for efficiently transmitting the path selection signal 413 to both the UEs 10A and the UE 10B.

In the example of FIG. 4 it is assumed that the path selection signal 413 causes the UE 10B to select the QoS data path 22B and causes the UE 10A to select the QoS data path 21A (i.e., maintain its previous selection). As a consequence, the UE 10B then transmits HQ service data 414 through the QoS data path 22B to the AF 250, and the UE 10A continues to transmit LQ service data 415 through the QoS data path 21A to the AF 250.

At a given time, e.g., in response to a decision process as the AF 250, the AF 250 provides a further path selection signal 416 to the UE 10A and to the UE 10B. The path selection signal 416 may for example be transmitted as a service layer command of the group service session, or may be conveyed as part of lower layer control signaling, e.g., in transport layer acknowledgments transmitted from the AF to the UEs 10A, 10B. It is also possible to use a broadcast mode for efficiently transmitting the path selection signal 413 to both the UEs 10A and the UE 10B.

In the example of FIG. 4 it is assumed that the path selection signal 416 causes the UE 10A to select the QoS data path 22A and causes the UE 10B to select the QoS data path 21B (i.e., change their previous selection and switch to another configuration). As a consequence, the UE 10B then transmits LQ service data 414 through the QoS data path 21B to the AF 250, and the UE 10A to transmits HQ service data 418 through the QoS data path 22A to the AF 250.

As can be seen, the processes of FIG. 4 allow for quickly switching between different QoS levels utilized by the UEs 10A, 10B, without requiring reconfiguration of the QoS data paths 21A, 22A, 21B, 22B.

Figure 5:
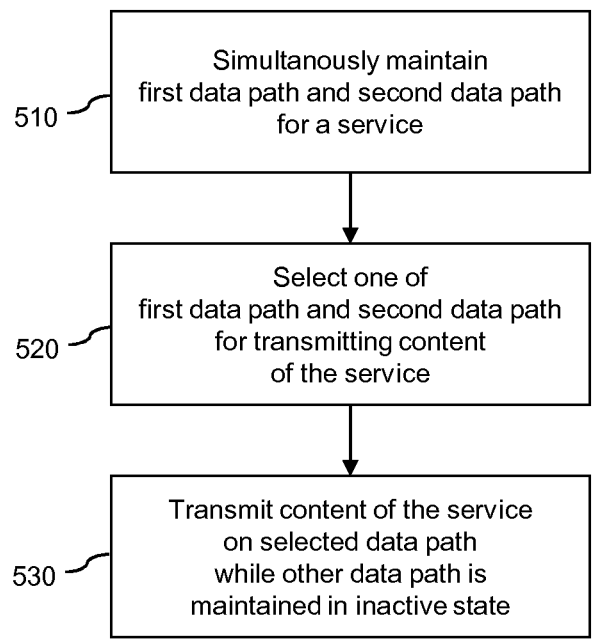
FIG. 5 shows a flowchart for schematically illustrating a method performed by a device operating according to an embodiment of the invention.

FIG. 5 shows a flowchart for illustrating a method of controlling data traffic in a wireless communication network. The method of FIG. 5 may be used for implementing the above-described concepts in a wireless communication device, e.g., corresponding to any of the above-mentioned UEs 10, 10A, 10B.

If a processor-based implementation of the wireless communication device is used, at least some of the steps of the method of FIG. 5 may be performed and/or controlled by one or more processors of the wireless communication device. Such wireless communication device may also include a memory storing program code for implementing at least some of the below described functionalities or steps of the method of FIG. 5.

At step 510, the wireless communication device simultaneously maintains a first data path and a second data path to the wireless communication network. The first data path and the second data path are provided for the same service utilized by the wireless communication device. The first data path has a first QoS level and the second data path has a second QoS level. The first data path and the second data path may for example correspond to the above-mentioned QoS data paths 21, 22, 21A, 22A, 21B, 22B.

The second QoS level is different from the first QoS level. For example, the first data path may have a first GBR and the second data path a second GBR that is higher than the first GBR. In addition or as an alternative, the first data path may have a first maximum delay and the second data path a second maximum delay that is lower than the first maximum delay. The maximum delay may for example be defined in terms of a PDB. In addition or as an alternative, the first data path may have a first traffic handling priority and the second data path a second traffic handling priority that is higher than the first traffic handling priority. Still further, the first data path and the second data path may also differ with respect to error tolerance, e.g., defined in terms of PER.

The first data path may be identified by a first IP 5-tuple while the second data path is identified by a second IP 5-tuple which is different from the first IP 5-tuple. For example, a destination port of the second IP 5-tuple may be different from a destination port of the first IP 5-tuple. Alternatively or in addition, a source port of the second IP 5-tuple may be different from a source port of the first IP 5-tuple.

At step 520, the wireless communication device selects one of the first data path and the second data path for transmitting content of the service, while the other of the first data path and the second data path is maintained in an inactive state. For example, at a first time, the wireless communication device may select the first data path for transmitting the content while the second data path is maintained in the inactive state, and at a second time, the wireless communication device may select the second data path for transmitting the content while the first data path is maintained in the inactive state.

In some scenarios, the wireless communication device may be part of a group of wireless communication devices which each simultaneously maintaining a corresponding first data path and a corresponding second data path to the wireless communication network, with the corresponding first data path having the first QoS level and the corresponding second data path having the second QoS level. In particular, the wireless communication device may be part of a group of wireless communication devices each operating by performing steps like step 510, 520, and 530. In this case, the wireless communication device may select the second data path in the case of the other wireless communication devices of the group selecting the corresponding first data path, or the wireless communication device may select the first data path in the case of another wireless communication device of the group selecting the corresponding second data path.

In some scenarios, the wireless communication device may receive a control signal and perform the selection of step 520 in response to the control signal. Examples of such control signals are the path selection signals 406, 413, and 416 in the example of FIG. 4.

At step 530, the wireless communication device may transmit content of the service on the selected data path while the other of the first data path and the second data path is maintained in an inactive state. In some scenarios, this may also involve adapting the content to a desired quality level.

In the method of FIG. 5, the content may include multimedia content, e.g., live video content captured by a camera associated with the wireless communication device. The content may have different quality levels, such as the HQ video and LQ video in the above-mentioned examples. However, also for other content types, different quality levels of service data could be defined.

Figure 6:
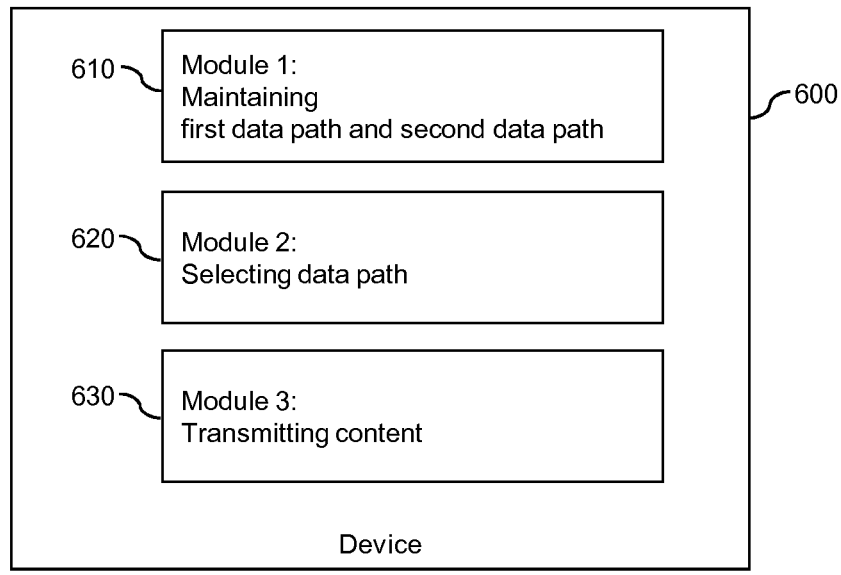
FIG. 6 shows an exemplary block diagram for illustrating functionalities of a device implementing functionalities corresponding to the method of FIG. 5.

FIG. 6 shows a block diagram for illustrating functionalities of a wireless communication device 600 which operates according to the method of FIG. 5. The radio device 600 may for example correspond to any of the above-mentioned UEs 10, 10A, 10B. As illustrated, the wireless communication device 600 may be provided with a module 610 configured to simultaneously maintain a first data path and a second data path for a service, such as explained in connection with step 510. Further, the wireless communication device 600 may be provided with a module 620 configured to select one of the first data path and the second data path for transmitting content of the service, such as explained in connection with step 520. Further, the wireless communication device 600 may be provided with a module 630 configured to transmit content of the service on the selected data path, such as explained in connection with step 530.

It is noted that the wireless communication device 600 may include further modules for implementing other functionalities, such as known functionalities of a UE in the LTE and/or NR radio technology. Further, it is noted that the modules of the wireless communication device 600 do not necessarily represent a hardware structure of the wireless communication device 600, but may also correspond to functional elements, e.g., implemented by hardware, software, or a combination thereof.

Figure 7:
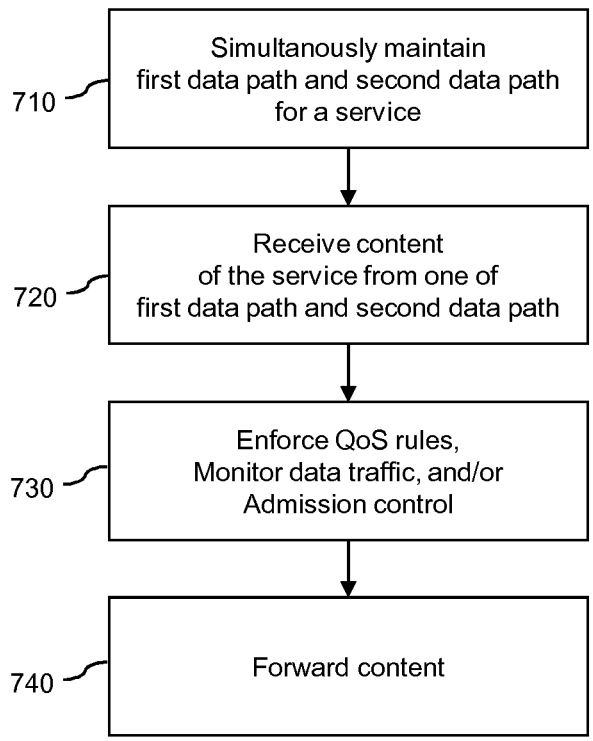
FIG. 7 shows a flowchart for schematically illustrating a method performed by a network node operating according to an embodiment of the invention.

FIG. 7 shows a flowchart for illustrating a further method of controlling data traffic in a wireless communication network. The method of FIG. 7 may be used for implementing the above-described concepts in a node of the wireless communication network, in particular a node which is responsible for conveying user data traffic, e.g., a RAN node, such as one of the above-mentioned access node, or a CN node, such as the above-mentioned GW 120.

If a processor-based implementation of the node is used, at least some of the steps of the method of FIG. 7 may be performed and/or controlled by one or more processors of the node. Such node may also include a memory storing program code for implementing at least some of the below described functionalities or steps of the method of FIG. 7.

At step 710, the node simultaneously maintains a first data path and a second data path to a wireless communication device, such as one of the above-mentioned UEs 10, 10A, 10B. The first data path and the second data path are provided for the same service utilized by the wireless communication device. The first data path has a first QoS level and the second data path has a second QoS level. The first data path and the second data path may for example correspond to the above-mentioned QoS data paths 21, 22, 21A, 22A, 21B, 22B.

The second QoS level is different from the first QoS level. For example, the first data path may have a first GBR and the second data path a second GBR that is higher than the first GBR. In addition or as an alternative, the first data path may have a first maximum delay and the second data path a second maximum delay that is lower than the first maximum delay. The maximum delay may for example be defined in terms of a PDB. In addition or as an alternative, the first data path may have a first traffic handling priority and the second data path a second traffic handling priority that is higher than the first traffic handling priority. Still further, the first data path and the second data path may also differ with respect to error tolerance, e.g., defined in terms of PER.

The first data path may be identified by a first IP 5-tuple while the second data path is identified by a second IP 5-tuple which is different from the first IP 5-tuple. For example, a destination port of the second IP 5-tuple may be different from a destination port of the first IP 5-tuple. Alternatively or in addition, a source port of the second IP 5-tuple may be different from a source port of the first IP 5-tuple.

At step 720, the node receives content of the service on one of the first data path and the second data path, while the other of the first data path and the second data path is maintained in an inactive state. For example, at a first time, the wireless communication device may receive the content from the first data path while the second data path is maintained in the inactive state, and at a second time, the wireless communication device may receive the content from the second data path while the first data path is maintained in the inactive state.

At step 740, the node may forward the content to a destination node, e.g., to the above-mentioned AF 250 or production center 250. If the first data path and the second data path are identified by different IP 5-tuples, the forwarded content may be transported using the same IP 5-tuple irrespective of the content being received from the first data path or the second data path. For this purpose, the node may for example include functionalities as described above for the proxy node 150.

At step 730, the node may enforce a first set of QoS rules for the service on the first data path and enforce a second set of QoS rules for the service on the second data path, with the second set of QoS rules being different from the first set of QoS rules. The node may receive the first set of QoS rules and the second set of QoS rules from a policy controller of the wireless communication network, such as the above-mentioned policy controller 180. Alternatively or in addition, step 730 may involve that the node monitors data traffic of the service on the first data path and on the second data path. The node may report results of this monitoring to a policy controller of the wireless communication network, such as the above-mentioned policy controller 180. The monitoring may take into account that the wireless communication device a be part of a group of wireless communication devices, each having a corresponding first data path and a corresponding second data path to the wireless communication network, having the first QoS level and the second QoS level, respectively, and that at a given time only one wireless communication device of the group is allowed to utilize the corresponding second data path, while the other wireless communication devices of the group utilize the corresponding first data path.

In some scenarios, the wireless communication device is part of a group of wireless communication devices each simultaneously maintaining a corresponding first data path and a corresponding second data path to the wireless communication network, having the first QoS level and the second QoS level, respectively. In such cases, step 730 may also involve that the node performs admission control for the first data paths and the second data paths based on a policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state. For example, the node may be a RAN node, such as one of the above-mentioned RAN nodes, and the node may consider the policy in RAN based admission control processes, e.g., when admitting or rejecting requests related to the QoS data paths.

In the method of FIG. 7, the content may include multimedia content, e.g., live video content captured by a camera associated with the wireless communication device. The content may have different quality levels, such as the HQ video and LQ video in the above-mentioned examples. However, also for other content types, different quality levels of service data could be defined.

Figure 8:
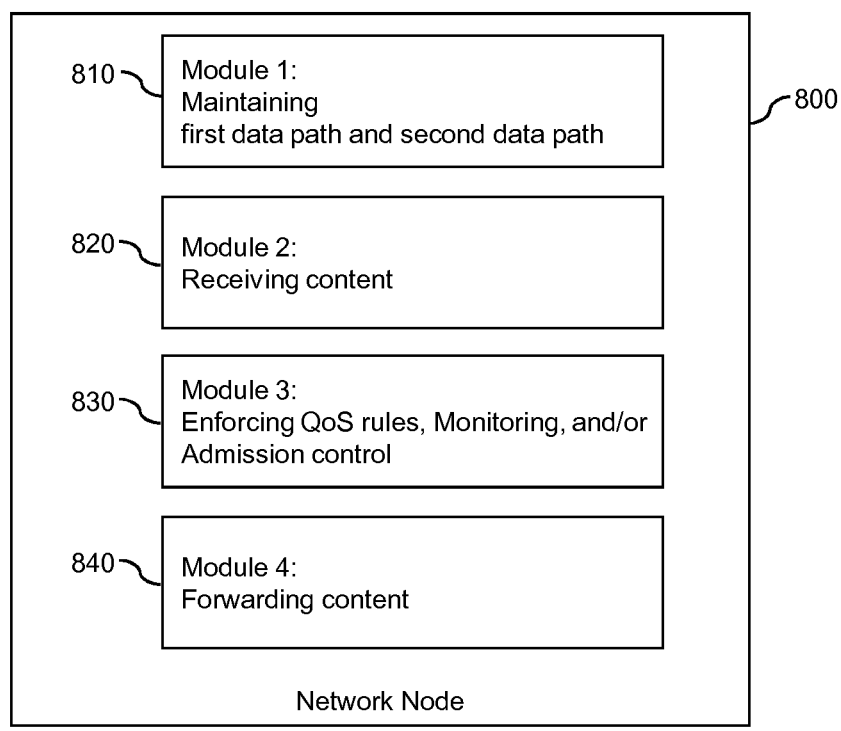
FIG. 8 shows an exemplary block diagram for illustrating functionalities of a network node implementing functionalities corresponding to the method of FIG. 5.

FIG. 8 shows a block diagram for illustrating functionalities of a network node 800 for a wireless communication network, which operates according to the method of FIG. 7. The network node 800 may for example correspond to the above-mentioned GW 120. As illustrated, the network node 800 may be provided with a module 810 configured to simultaneously maintain a first data path and a second data path for a service, such as explained in connection with step 710. Further, the network node 800 may be provided with a module 820 configured to receive content of the service from one of the first data path and the second data path, such as explained in connection with step 720. Further, the network node 800 may be provided with a module 830 configured to enforce QoS rules and/or monitor data traffic, such as explained in connection with step 730. Further, the network node 800 may be provided with a module 840 configured to forward the content of the service, such as explained in connection with step 740.

It is noted that the network node 800 may include further modules for implementing other functionalities, such as known functionalities of a gateway or other node conveying user data traffic in the LTE and/or NR radio technology. Further, it is noted that the modules of the network node 800 do not necessarily represent a hardware structure of the network node 800, but may also correspond to functional elements, e.g., implemented by hardware, software, or a combination thereof.

Figure 9:
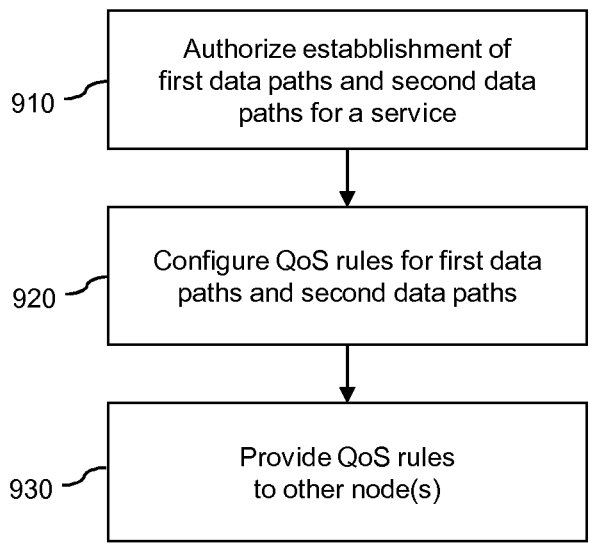
FIG. 9 shows a flowchart for schematically illustrating a further method performed by a network node operating according to an embodiment of the invention.

FIG. 9 shows a flowchart for illustrating a further method of controlling data traffic in a wireless communication network. The method of FIG. 9 may be used for implementing the above-described concepts in a node of the wireless communication network, in particular a node which is responsible for controlling data traffic, such as the above-mentioned policy controller 180.

If a processor-based implementation of the node is used, at least some of the steps of the method of FIG. 9 may be performed and/or controlled by one or more processors of the node. Such node may also include a memory storing program code for implementing at least some of the below described functionalities or steps of the method of FIG. 9.

The method assumes that a group of wireless communication devices, such as the above-mentioned UEs 10, 10A, 10B, utilizes a service, e.g., a group service for conveying multimedia data. At step 910, the node authorizes, for each of the wireless communication devices, establishment of a corresponding first data path and a corresponding second data path to the wireless communication network. The first data paths and the second data paths are provided for the same service utilized by the wireless communication devices. The first data paths have a first QoS level and the second data paths have a second QoS level. The first data paths and the second data paths may for example correspond to the above-mentioned QoS data paths 21, 22, 21A, 22A, 21B, 22B.

The second QoS level is different from the first QoS level. For example, the first data path may have a first GBR and the second data path a second GBR that is higher than the first GBR. In addition or as an alternative, the first data path may have a first maximum delay and the second data path a second maximum delay that is lower than the first maximum delay. The maximum delay may for example be defined in terms of a PDB. In addition or as an alternative, the first data path may have a first traffic handling priority and the second data path a second traffic handling priority that is higher than the first traffic handling priority. Still further, the first data path and the second data path may also differ with respect to error tolerance, e.g., defined in terms of PER.

The first data path may be identified by a first IP 5-tuple while the second data path is identified by a second IP 5-tuple which is different from the first IP 5-tuple. For example, a destination port of the second IP 5-tuple may be different from a destination port of the first IP 5-tuple. Alternatively or in addition, a source port of the second IP 5-tuple may be different from a source port of the first IP 5-tuple.

At step 920, the node configures QoS rules for the first data paths and for the second data paths. The QoS rules may include, for each of the wireless communication devices, a first set of QoS rules for the service on the first data path and enforce a second set of QoS rules for the service on the second data path.

Authorizing of establishment of the first data paths and the second data paths at step 910 and/or said configuring of the QoS rules at step 920 is based on policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state.

At step 930, the node may provide the QoS rules to one or more other nodes of the wireless communication network, such as to the above-mentioned GW 120.

In the method of FIG. 9, the content may include multimedia content, e.g., live video content captured by a camera associated with the wireless communication device. The content may have different quality levels, such as the HQ video and LQ video in the above-mentioned examples. However, also for other content types, different quality levels of service data could be defined.

Figure 10:
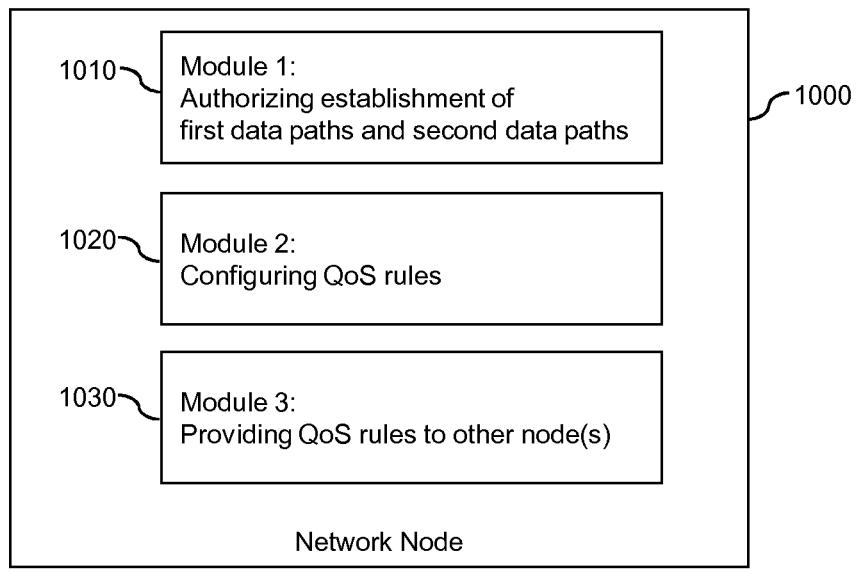
FIG. 10 shows an exemplary block diagram for illustrating functionalities of a network node implementing functionalities corresponding to the method of FIG. 9.

FIG. 10 shows a block diagram for illustrating functionalities of a network node 1000 for a wireless communication network, which operates according to the method of FIG. 9. The network node 1000 may for example correspond to the above-mentioned policy controller 180. As illustrated, the network node 1000 may be provided with a module 1010 configured to authorize establishment of first data paths and a second data paths for a service utilized by a group of wireless communication devices, such as explained in connection with step 910. Further, the network node 1000 may be provided with a module 1020 configured to configure QoS rules for the first data paths and the second data paths, such as explained in connection with step 920. Further, the network node 1000 may be provided with a module 1030 configured to provide the QoS rules to one or more other nodes of the wireless communication network, such as explained in connection with step 930.

It is noted that the network node 1000 may include further modules for implementing other functionalities, such as known functionalities of a PCRF in the LTE technology and/or of a PCF in the NR radio technology. Further, it is noted that the modules of the network node 1000 do not necessarily represent a hardware structure of the network node 1000, but may also correspond to functional elements, e.g., implemented by hardware, software, or a combination thereof.

It is noted that the illustrated concepts could also be implemented in a system including one or more wireless communication devices operating according to the method of FIG. 5 and one or more network nodes operating according to the method of FIG. 7. In addition or as an alternative to the network node operating according to the method of FIG. 7, the system could also include a policy controller operating according to the method of FIG. 9.

Figure 11:
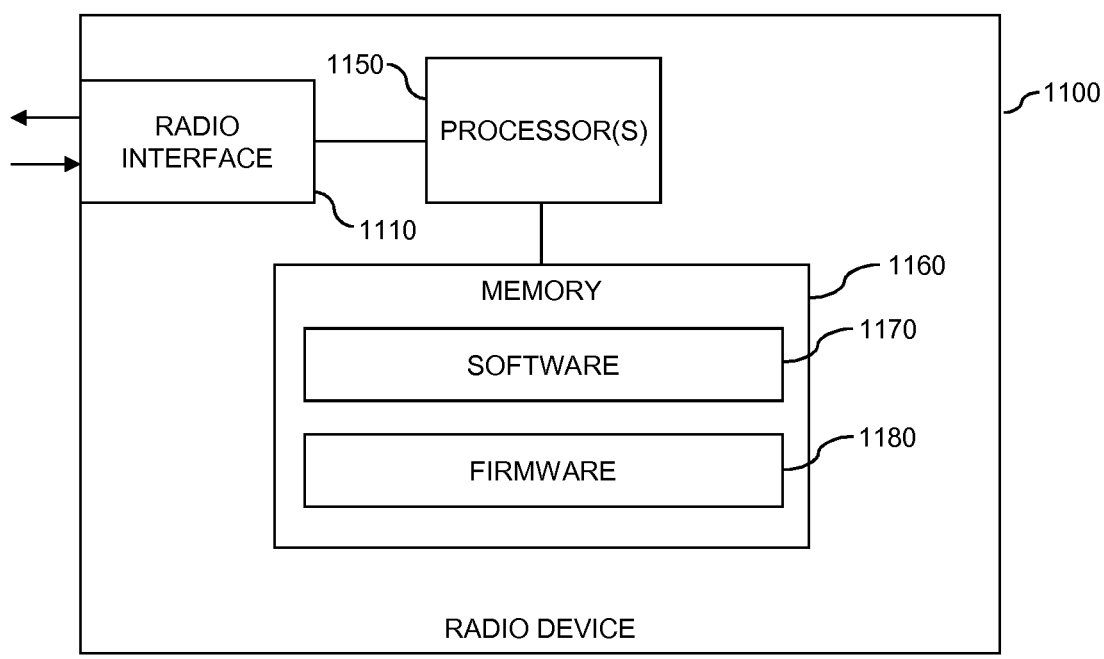
FIG. 11 schematically illustrates structures of a device according to an embodiment of the invention.

FIG. 11 illustrates a processor-based implementation of a wireless communication device 1100 which may be used for implementing the above-described concepts. For example, the structures as illustrated in FIG. 11 may be used for implementing the concepts in any of the above-mentioned UEs 10, 10A, 10B.

As illustrated, the wireless communication device 1100 includes one or more radio interfaces 1110. The radio interface(s) 1110 may for example be based on the LTE technology or the NR technology.

Further, the radio device 1100 may include one or more processors 1150 coupled to the radio interface(s) 1110 and a memory 1160 coupled to the processor(s) 1150. By way of example, the radio interface(s) 1110, the processor(s) 1150, and the memory 1160 could be coupled by one or more internal bus systems of the wireless communication device 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities for controlling data traffic, such as explained in connection with FIGS. 5 and 6.

It is to be understood that the structures as illustrated in FIG. 11 are merely schematic and that the wireless communication device 1100 may actually include further components which, for the sake of clarity, have not been illustrated, e.g., further interfaces or processors. Also, it is to be understood that the memory 1160 may include further program code for implementing known functionalities of a UE. According to some embodiments, also a computer program may be provided for implementing functionalities of the wireless communication device 1100, e.g., in the form of a physical medium storing the program code and/or other data to be stored in the memory 1160 or by making the program code available for download or by streaming.

Figure 12:
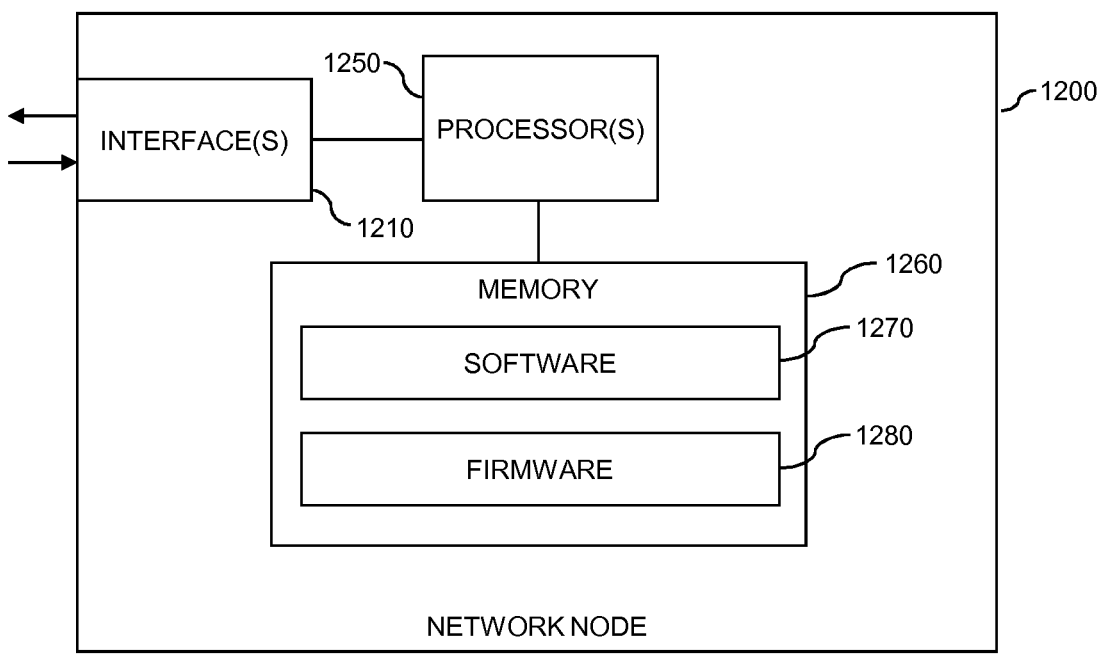
FIG. 12 schematically illustrates structures of a network node according to an embodiment of the invention.

FIG. 12 illustrates a processor-based implementation of a network node 1200 which may be used for implementing the above-described concepts. For example, the structures as illustrated in FIG. 12 may be used for implementing the concepts in any of the above-mentioned network nodes 110, 120, 150, 180.

As illustrated, the network node 1200 includes one or more interfaces 1210. The interface(s) 1210 may for example be configured for communication with wireless communication devices, such as the above-mentioned UEs 10, 10A, 10B, or for communication with other network nodes, such as for communication between the above-mentioned GW 120 and policy controller 180. If the network node 1200 corresponds to a RAN node, such as one of the above-mentioned access nodes 110, the interface(s) may also include a radio interface for establishing radio links to wireless communication devices, such as the above-mentioned UEs 10, 10A, 10B.

Further, the network node 1200 may include one or more processors 1250 coupled to the interface(s) 1210 and a memory 1260 coupled to the processor(s) 1250. By way of example, the interface(s) 1210, the processor(s) 1250, and the memory 1260 could be coupled by one or more internal bus systems of the network node 1200. The memory 1260 may include a ROM, e.g., a flash ROM, a RAM, e.g., a DRAM or SRAM, a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling data traffic, such as explained in connection with FIGS. 7 to 10.

It is to be understood that the structures as illustrated in FIG. 12 are merely schematic and that the network node 1200 may actually include further components which, for the sake of clarity, have not been illustrated, e.g., further interfaces or processors. Also, it is to be understood that the memory 1260 may include further program code for implementing known functionalities of a network node, e.g., known functionalities of a PDW or UDF. According to some embodiments, also a computer program may be provided for implementing functionalities of the network node 1200, e.g., in the form of a physical medium storing the program code and/or other data to be stored in the memory 1260 or by making the program code available for download or by streaming.

As can be seen, the concepts as described above may be used for efficiently controlling data traffic of a service with respect to QoS. In particular, switching between different QoS levels for conveying the data traffic is facilitated. Furthermore, by coordinated utilization of the different QoS levels in a group of wireless communication devices, available resources can be utilized in an efficient manner.

It is to be understood that the examples and embodiments as explained above are merely illustrative and susceptible to various modifications. For example, the illustrated concepts may be applied in connection with various kinds of radio technologies, without limitation to the LTE technology or NR technology. Further, the concepts may be applied with respect to various types of UEs and content, without limitation to without limitation to video content. Further, the concepts may be utilized in various application fields, without limitation to video production. For example, the illustrated concepts could also be utilized in a videoconferencing system or in a multimedia conferencing system. Further, it is noted that the concepts may be applied to any number of different QoS levels and to any number of participating wireless communication devices. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling data traffic in a wireless communication network, the method comprising:
    for a service utilized by a wireless communication device, the wireless communication device simultaneously maintaining a first data path and a second data path to the wireless communication network, the first data path having a first quality of service, QoS, level and the second data path having a second QoS level that is different from the first QoS level;
    the wireless communication device receiving a control signal, the control signal being received as a service layer command of a group service session;
    in response to the control signal, the wireless communication device selecting one of the first data path and the second data path for transmitting content of the service while the other of the first data path and the second data path is maintained in an inactive state, the selected one of the first data path and the second data path having a higher video quality than the other of the first data path and the second data path, video data of the wireless communication device being selected by a production center from among video data of a plurality of wireless communication devices for compilation of a program; and
    the production center providing service information to a policy controller in response to a second UE joining the group service session, the service information identifying a group service type and the group service session.

2. The method according to claim 1, comprising:
- at a first time, the wireless communication device selecting the first data path for transmitting the content while the second data path is maintained in the inactive state; and
- at a second time, the wireless communication device selecting the second data path for transmitting the content while the first data path is maintained in the inactive state.

3. The method according to claim 1, wherein the first data path has a first guaranteed bitrate and the second data path has a second guaranteed bitrate that is higher than the first guaranteed bitrate.

4. The method according to claim 1, wherein the first data path has a first maximum delay and the second data path has a second maximum delay that is lower than the first maximum delay.

5. The method according to claim 1, wherein the first data path has a first traffic handling priority and the second data path has a second traffic handling priority that is higher than the first traffic handling priority.

6. The method according to claim 1, wherein the content comprises multimedia content.

7. The method according to claim 1, wherein the content comprises live video content captured by a camera associated with the wireless communication device.

8. The method according to claim 1, wherein the first data path is identified by a first Internet Protocol, IP, 5-tuple and the second data path is identified by a second IP 5-tuple which is different from the first IP 5-tuple.

9. The method according to claim 7, wherein a destination port of the second IP 5-tuple is different from a destination port of the first IP 5-tuple.

10. The method according to claim 8, wherein a source port of the second IP 5-tuple is different from a source port of the first IP 5-tuple.

11. The method according to claim 1, wherein the wireless communication device is part of a group of wireless communication devices each simultaneously maintaining a corresponding first data path and a corresponding second data path to the wireless communication network, the corresponding first data path having the first QoS level and the corresponding second data path having the second QoS level; and
- wherein the wireless communication device selects the second data path in the case of the other wireless communication devices of the group selecting the corresponding first data path.

12. The method according to claim 1, wherein the wireless communication device is part of a group of wireless communication devices each simultaneously maintaining a corresponding first data path and a corresponding second data path (to the wireless communication network, the corresponding first data path having the first QoS level and the corresponding second data path having the second QoS level; and
- wherein the wireless communication device selects the first data path in the case of another wireless communication device of the group selecting the corresponding second data path.

13. A method of controlling data traffic in a wireless communication network, the method comprising:
- for a service utilized by a wireless communication device, a node of the wireless communication network simultaneously maintaining a first data path and a second data path to the wireless communication device, the first data path having a first QoS level and the second data path having a second QoS level that is different from the first QoS level; and
- the node receiving content of the service from one of the first data path and the second data path while the other of the first data path and the second data path is maintained in an inactive state, the content received from the one of the first data path and the second data path having a higher video quality than the second data path, video data of the wireless communication device being selected by a production center from among video data of a plurality of wireless communication devices for compilation of a program, the selection by the production center being indicated by a control signal sent to the wireless device, the control signal being received as a service layer command of a group service session.

14. A method of controlling data traffic in a wireless communication network, the method comprising:
- for a service utilized by a group of wireless communication devices and for each wireless communication device of the group, a node of the wireless communication network authorizing establishment of a corresponding first data path and a corresponding second data path to the wireless communication network, the first data paths having a first QoS level and the second data paths having a second QoS level that is different from the first QoS level,
- the node configuring QoS rules for the first data paths and the second data paths,
- one or both of the authorizing of establishment of the first data paths and the second data paths and the configuring of the QoS rules being based on a policy allowing that one of the wireless communication devices transmits content of the service on the corresponding second data path while simultaneously the corresponding first data path is maintained in an inactive state and the other wireless communication devices transmit content of the service on the corresponding first data path while the corresponding second data path is maintained in an inactive state, the transmitted content on the first data path having a higher video quality than that of the transmitted content on the first data path, a selection of video data of the one wireless communication device being performed by a production center for compilation of a program, the selection by the production center being indicated by a control signal sent to the wireless device, the control signal being received as a service layer command of a group service session; and
- the production center providing service information to a policy controller in response to a second UE joining the group service session, the service information identifying a group service type and the group service session.

15. The method according to claim 14, wherein the first data paths have a first guaranteed bitrate and the second data paths have a second guaranteed bitrate that is higher than the first guaranteed bitrate.

16. The method according to claim 14, wherein the first data path has a first maximum delay and the second data path has a second maximum delay that is lower than the first maximum delay.

17. The method according to claim 14, wherein the first data paths have a first traffic handling priority and the second data path have a second traffic handling priority that is higher than the first traffic handling priority.

18. The method according to claim 14, wherein the content comprises multimedia content.

19. The method according to claim 14, comprising:
wherein the content comprises live video content captured by a camera associated with the respective wireless communication device.

* * * * *